United States Patent [19]

Marié

[11] 4,175,830
[45] Nov. 27, 1979

[54] WAVE MODE CONVERTER

[76] Inventor: Georges R. P. Marié, 17, Avenue Raymond Croland, Fontenay-aux-Roses, France, 92260

[21] Appl. No.: 863,235

[22] Filed: Dec. 22, 1977

[30] Foreign Application Priority Data

Dec. 23, 1976 [FR] France .................................. 76 38960

[51] Int. Cl.$^2$ .............................................. G02B 5/00
[52] U.S. Cl. ......................................... 350/157; 176/1
[58] Field of Search ............. 350/157, 175 DR; 176/1

[56] References Cited

U.S. PATENT DOCUMENTS 3,892,469  7/1975  Lotspeich .............................. 350/157
3,892,470  7/1975  Lotspeich .............................. 350/150

Primary Examiner—John K. Corbin
Assistant Examiner—R. A. Rosenberger
Attorney, Agent, or Firm—Abraham A. Saffitz

[57] ABSTRACT

Mode converter for electromagnetic, light or infrared waves. This mode converter converts particle non-confining modes to particle confining modes. In a confining mode wave beam the phase of the wave with respect to time at a point of the beam having a given azimuth with respect to the beam axis is proportional to this azimuth. Two types of mode converter are disclosed. In the first type, the wave passes through a block of transparent isotropic material the thickness of which is proportional to the azimuth around the beam axis. In the second type, the converter is formed with triangular or sectoral plates of birefringent material and in each plate the slow and fast axes are given an adequate orientation.

13 Claims, 13 Drawing Figures

FIG.5
FIG.4
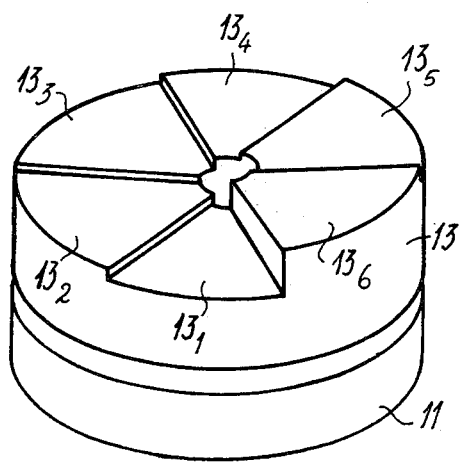
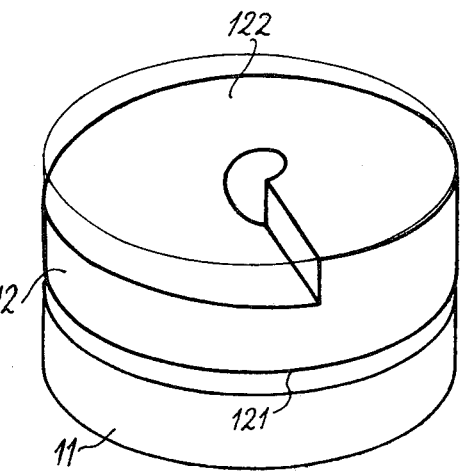
FIG.6
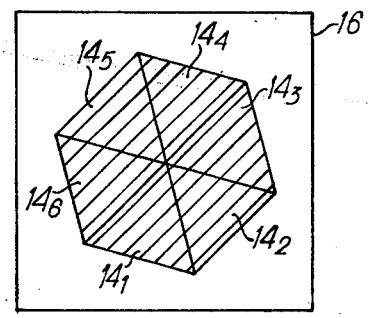
FIG.7
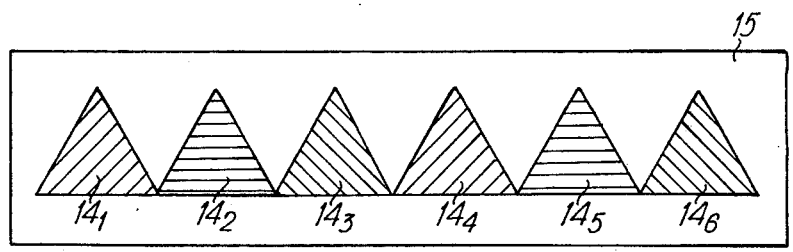

WAVE MODE CONVERTER

BACKGROUND OF THE INVENTION

1. Field of the Invention

The invention relates to wave mode converters and, more particularly, to wave non-confining mode to wave confining mode converters. The invention also concerns laser devices transmitting confining mode waves.

When a laser beam is focused on to a material, a plasma is formed. It has been found that the propagation mode of the wave focused on to the material has a very important effect on the formation of the plasma and the confinement thereof.

The object of the invention is to control and confine a plasma jet by (a) forcing the laser beam to propagate in particular modes to be described hereinafter and (b) subjecting the plasma to a magnetic field having a steep gradient in the direction of the axis of propagation. Generally, the confining modes are wave beam modes wherein the electric field vector at a point in a wave plane has a time phase shift equal or proportional to the azimut of the point considered with respect to the beam axis. Further the confining mode waves are circularly polarized waves. The advantage of these forms of mode propagation is that they constitute the most effective method of confining the plasma along the beam propagation axis.

In official wave nomenclature, the wave mode if followed by two subscripts. The first indicates the number of space periods in the azimutal direction, and the second indicates the number of space petiods in the radial direction. In the present specification we shall never write the second subscript, since from this point of view, the mode will always be close to the fundamental conditions, with a relatively small proportion of harmonics which may vary in dependence on the distance from the beam axis when the wave amplitude is varied.

The magnetic field can be used to obtain resonance, in the neighbourhood of which the confining forces are considerably increased. Furthermore, when the axial magnetic field has a steep axial gradient, the observed phenomena changes with the sign of the gradient. If the field maximum is on the side of the material receiving the impact, the ions rotating in the plasma rings are compressed against the material, which increases impacts between ions and assists approach of nuclear fusion phenomena. If, on the other hand, the mininum magnetic field is on the side of the material, the ions rotating in the rings move away from the material, the plasma is stretched along the axis, and the ions rotating in the rings are regrouped at a certain distance from the material, which assists the emission of coherent X-rays.

We shall now describe the configuration of waves having circular polarization and a positive or negative azimuth phase-shift.

In a phase plane referred to by the axes Ox, Oy and taken as complex reference plane, the electric field of a circular-polarized plane wave having the angular frequency $\omega$ can be represented by the complex number:

$$E = E_o \exp(j\omega t)$$

where $E_o$ is a reference amplitude of the electric field and $j = \sqrt{-1}$. Such a wave is said to be azimuthally phase-shifted around the propagation axis, taken as the Oz axis, if, with respect to the previously-defined plane wave, it undergoes a phase shift or rotation of the polarisation vector proportional to the azimuth $\phi$. The phase shift must comprise a whole number of periods per complete aziputh revolution around the axis, but the electric field amplitude cannot be uniform since it must be zero along the axis where the azimuth is indeterminate. In addition the wave must be represented by an analytic function. Consequently, near the axis, at a short distance r therefrom, the electric field vector is represented by the following complex number:

$$E = E_o (r/r_o)^N \exp j (\omega t \pm N\phi) \quad (1)$$

where N is an integer and $r_o$ is a reference radius vector.

The preceding is the first term in the series expansion of a function which, when r increases, passes through a maximum and subsequently falls to zero.

These waves vary greatly depending whether the phase-shift varies in the direction of $\omega t$ (in which case it is said to be positive) or in the opposite direction (when it is called negative).

In the case of a positively phase-shifted first-order wave (for which $N=1$), the electric field is represented by the complex number:

$$E = E_o \frac{r}{r_o} \exp j (\omega t + \phi) \quad (2)$$

and can be considered as the sum of two fields of vectors corresponding respectively to the following complex numbers:

$$E' = E_o \frac{r}{r_o} \exp(j\phi) \cos \omega t \quad (2a)$$

$$E'' = E_o \frac{r}{r_o} \exp(j\phi) j \sin \omega t \quad (2b)$$

Expression (2a) denotes a field of radially-disposed electric vectors, like those of the $TM_O$ mode in circular waveguides, the lines of force being radii indicated by chain lines in FIG. 1. Expression (2b) denotes a field of orthoradial vectors having lines of force denoted by circles indicated by continuous lines in FIG. 1. The circular lines of force are similar to those of the $TE_O$ mode in a circular waveguide (as already said, the single subscript denotes the number of aziputhal space periods).

The field of electric vectors of a first-order aziputhally phase-shifted circular-polarized wave, the phase-shift being negative, can be represented by the complex number:

$$E = E_o \frac{r}{r_o} \exp j (\omega t - \phi) \quad (3)$$

i.e. the sum of the fields:

$$E' = E_o \frac{r}{r_o} \exp(-j\phi) \cos \omega t \quad (3a)$$

$$E'' = E_o \frac{r}{r_o} \exp(-j\phi) j \sin \omega t \quad (3b)$$

The fields of vectors corresponding to expressions (3a) and (3b) are very similar to fields of electric vectors of two orthogonal waves in phase quadrature denoted by $TE_2$ in the theory of circular waveguides.

The lines of force can be determined as follows. At a given point P (FIG. 2), the electroc field is at an angle $-2\phi$ to the radius vector $\overrightarrow{OP}$. It is known that, in the case of two points P and P' very close together and having the coordinates r, $\phi$ and r+dr, $\phi+\phi$ respectively, the angle between the direction PP' and the radius vector has the tangent $rd\phi/dr$. Consequently, the lines of forces are governed by the following differential equation:

$$rd\phi/dr = -tg(2\phi) \tag{4}$$

which is integrated to:

$$r = \frac{k}{[\sin 2\phi]^{\frac{1}{2}}} \tag{4}$$

k being a constant. In Cartesian coordinates, expression (4) is written:

$$r^2 \sin\phi \cos\phi = xy = k^2/2 \tag{4'}$$

The lines of forces are equilateral hyperbolas, as shown in continuous lines in FIG. 2. If the azimuth origin is shifted by $\pi/4$, we obtain a second family of lines of force, consisting of equilateral hyperbolas orthogonal to the preceding ones and shown by chain lines in FIG. 2. The two fields of vectors vibrate in phase quadrature. At any point on the plane, the wave is circular-polarized. There is no privileged point. For this reason, point M on the Ox axis (FIG. 2) at a distance $r_o$ from the origin can be considered as a current point. A rectilinear radial line of force exciting a cylindrical vibration in the plasma passes through point M, and so does a hyperbolic orthoradial line of force having a radius of curvature equal to the distance from the origin (the radius of curvature of an equilateral hyperbola at its apex is equal to the distance between the apex and the center of symmetry of the equilateral hyperbola). When a charged particle moves under the action of an electric field having curved lines of force, the particle is subjected to an electric centrifugal force which tends to move it away from the center of curvature. In the case in FIG. 2, the lines of force have their convexity facing the beam axis and the particle approaches the axis on moving away from the center of curvature. In the case of the wave expressed by (2b) and shown in FIG. 1, the lines of force have their convexity facing the exterior, i.e. the electric centrifugal force moves the particle away from the axis. In this case, however, as we shall see, allowance must be made for a magnetic confining force, which is not negligible as in FIG. 2.

Before discussing the confining forces in greater detail, we shall study certain properties of circular-polarized waves having a positive or negative azimuthal phase shift, in the general case of the $N^{th}$ order. These properties are general versions of those found for the waves in equations (2) and (3) in the case of the first order (N=1).

By introducing the complex number $\xi$ $$\xi = r \exp j\phi \tag{5}$$

which denotes a point M on the complex plane of radius vector r and azimuth $\phi$, the electric field of circular-polarized waves having $N^{th}$ order azimuthal phase-shift can be rewritten in the form of a complex number:

$$E = E_o \left(\frac{\xi}{r_o}\right)^N \exp j\omega t \tag{6}$$

for a positive phase-shift and $$E = E_o \left(\frac{\xi^*}{r_o}\right)^N \exp j\omega t \tag{7}$$

for a negative phase shift, where $\xi^*$ denotes the conjugate complex of $\xi$.

The vector fields E defined by (6) and (7) are general versions of expressions (2) and (3). At a given point on the phase plane, E is a rotating vector which can be broken up into two sinusoidal vectors in fixed directions, perpendicular to one another and represented by the numbers E' and E'':

$$E' = E_o \left[\frac{r}{r_o}\right]^N \exp[\pm jN\phi] \cos\omega t \tag{8}$$

$$E'' = E_o \left[\frac{r}{r_o}\right]^N \exp[\pm jN\phi] j \sin\omega t$$

If we put the positive sign in front of jN for expressions derived from (6) and the negative sign for expressions from (7), the vectors rotate by $\pm N\phi$ when there is an increase of $\phi$ in the azimuth of the point where they are considered.

In calculating the lines of force of vectors E' or E'', we shall start from the fact that the tangent to these curves is at an angle $(\pm N - 1)\phi$ to the radius vector.

The differential expression for the tangent to the line of force gives the differential equation of these lines $$r \frac{d\phi}{dr} = \tan(\pm N - 1)(\phi - \phi_o) \tag{9}$$

By integration, we obtain the general equation of the lines of forces:

$$r = r_o [\sin[\pm N - 1](\phi - \phi_o)]^{\frac{1}{\pm N - 1}} \tag{10}$$

By way of example, in the case of positively phase-shifted waves, we must put the positive sign in front of N and (N−1) is zero for the first order. In that case, the differential equation is indefinite and its solutions are circles $r = r_o$ and radii $\phi = \phi_o$ characteristic of the modes $TE_O$ and $TM_O$ respectively and shown in FIG. 1.

An important case is where N is zero. Then equation (10) is as follows, after rearrangement:

$$r \sin(\phi - \phi_o) = r_o$$

This is a family of parallel straight lines. The corresponding wave is a rectilinear-polarized plane wave.

In the case of waves having first-order negative azimuthal phase-shoft, we have N=1 and a minus sign in front of N. Equation (10) is written as follows:

$$r = r_o[\sin 2(\phi - \phi_o)]^{-\frac{1}{2}}$$

If the two members are squared and we change over to Cartesian coordinates, we can immediately see that the lines of force are hyperbolas:

$$r^2 \times 2 \sin(\phi - \phi_o) \cos(\phi - \phi_o) = 2xy = r_o^2$$

as shown in FIG. 2.

The following is of importance for mode converters using half-wave plates and described hereinafter. Given two fields of vectors defined by complex numbers such as E' or E" in expressions (8), one corresponding to a value $\pm N_1$ and the other to a value $\pm N_2$, we can define the curved which is at any point tangent to the bisector of the two vectors. The tangent to this curve makes the following angle to the radius vector:

$$\frac{\pm N_1 \pm N_2 - 2}{2}(\phi - \phi_o) \quad (11)$$

Accordingly, the curve can be represented by an equation such as (10) in which N is equal to the arithmetic mean of $N_1$ and $N_2$.

In the present application, we shall show how a non-confining mode can be converted into a confining mode using contiguous sector-shaped half-wave plates, the fast axes of the sectors being approximately tangential to curves which, at all points bisect the curves of the field to be converted from one mode to the other. The calculation given hereinbefore is a model for the general calculation of these bisecting curves.

Clearly, field expressions such as (6) and (7) can be valid only over a restricted range, since the modulus increases indefinitely with distance from the beam axis.

This is unimportant when waveguides are used in the centimeter wave region, since in that case the range is accurately delimited. However, in the infrared or light wave region, it is necessary to focus in free space. Whereas in the previous case the electric-flux displacement current was closed by a conduction current flowing in the waveguide walls, it must now close in free space. Outside the range where expressions (6) and (7) remain valid, a "closure field" must be added to the "confining wave" field represented by (6) and (7). The set of fields can be broken up into the first term of a series expansion expressing these modes. We shall not discuss this breakdown in detail.

Particles in Confining Fields

We now return to the problem of confining charged particles subjected to a curved electric field.

Under the influence of a field E of angular frequency $\omega$, the shift $d\xi$ of an electron in motion aroung a mean position $\xi$ is as follows:

$$d\xi = \frac{-eE}{m\omega^2} \quad (12)$$

$d\xi$ and E being complex numbers representing periodically varying vectors, and m and e being the mass and charge of the electrons.

In order more closely to approximate the action of the field on the motion of the electron, we must allow for the variation dE of E when the electron shifts by $d\xi$ around $\xi$. In the case of a wave having a negative azimuthal phase-shift expressed by (7), we have:

$$dE = N\frac{d\xi^*}{\xi^*}E \quad (13)$$

If $\xi^*$ and $d\xi^*$ are replaced by their respective values as defined by (5) and (12), the force S corresponding to the complementary field dE can be written as follows:

$$S = edE = -\frac{Ne^2 EE^*}{m\omega^2 r} \exp j\phi \quad (14)$$

The quantity $EE^*$ is the square of the modulus $|E|$ of the electric field, irrespective of time and of the azimuth. Therefore, the complementary force S is a direct non-alternative force and the factor $(-\exp j\phi)$ indicates its orientation relative to the origin. This force is independent of the sign of the charge of the particle since e is squared, and it is inversely proportional to mass, which means that in practice it applies only to electrons, causing variations in the density of the negative charges, which is rapidly compensated by motion of the positive charges. Consequently, the circular-polarized waves having a negative azimuthal phase-shift subject to the plasma to a confining force which compresses it along the beam axis and has the following value per electron:

$$S_O = \frac{Ne^2 |E|^2}{m\omega^2 r} = \frac{Ne^2 E_o^2 r^{2N-1}}{m\omega^2 r_o^{2N}} \quad (15)$$

Actually, this calculation of the confining force $S_o$ is an approximation which is valid when the magnetic component of the confining force can be neglected. We have already stressed this fact in connection with the $TE_0$ wave, the lines of force for which are shown in FIG. 1, in which case a complete calculation of the confining force has to be made.

The confinement brought about by a light beam can be studied in the most general manner on the basis of the conservation of energy.

Take a permanent electromagnetic wave characterized by its electric field $\vec{E}$ in dependence on x, y, z and a sinusoidal function of time, the wave having an angular frequency $\omega$ and electrically charged free particles moving in the wave. Since the amplitude of field $\vec{E}$ varies with position, an oscillating particle is subjected to an asymmetrical force at the two ends of its trajectory, resulting in a shift in its mean position. The effect increases in proportion to the amplitude of oscillation, i.e. it is limited in practice almost exclusively to electrons, since nuclei do not react except to re-establish the neutrality of the plasma.

The problem can be tackled from its energy aspect. Assuming that there is no d.c. component of the electric field, the total kinetic energy averaged over a number of wave periods remains constant. The total kinetic energy is made up of kinetic energy of oscillation and kinetic energy of motion in translation.

If the system is closed, i.e. enclosed in a perfectly reflecting chamber which prevents losses by radiation, the kinetic energy of oscillation is at all points proportional to the square of the amplitude of the electric field $[E(x,y,z)]^2$, which is a function of the position. With regard to the motion in translation of the mean position around which the particle oscillates, we can assume that the mass of the particle is concentrated at the mean position and undergoes a force derived from a potential proportional to $E^2$. Thus, the minima of function $E^2$ constitute potential troughs into which the particle fall.

We shall hereinafter make a more detailed analysis of the forces acting in this case.

When the electron is bonded the phenomena is reversed, i.e. the force acting on the electron drives it, together with the nucleous bonded thereto, towards the regions where $E^2$ is at a maximum. This is because the kinetic energy is now added to the potential bonding energy, which decreases when the kinetic energy of oscillation increases. The force applied by the electric field E to the electron, acting against the potential bonding energy, drives the atom bonded to the electron towards the region where $E^2$ is at a maximum. As before, the force is derived from a potential proportional to $E^2$.

These shifts of particles are closely analogous to the motion of a dielectric sheet between the plates of an air capacitor. The dielectric sheet is sucked towards the interior of the capacitor in proportion to the square of the field amplitude and to $(\epsilon - 1)$, where $\epsilon$ is the permittivity. If a dialectric for which $\epsilon > 1$ is replaced by a medium having a permittivity $\epsilon$ less than unity, repulsion will occur (a medium in which free electrons oscillate without impacts is a medium in which $\epsilon < 1$).

We shall now calculate the confinement potential and analyse the behaviour of the electric field in detail. In the dynamic equation of the motion of an electron along an axis, radiation losses are expressed by a braking coefficient $-\eta m\omega \, dx/dt$. If the electron is bonded, the return force is written in the form $-m\Omega^2 x$, $\Omega$ being the angular resonance frequency of the atom. We then obtain the following expression for the kinetic energy of oscillation:

$$\frac{1}{2} mv^2 = \frac{1}{2} m \left[\frac{eE}{m\omega}\right]^2 \frac{1}{\eta^2 + \left[1 - \frac{\Omega^2}{\omega^2}\right]^2} \quad (16)$$

In the case of a free electron, in the absence of a magnetic field, $\Omega$ is zero and the braking coefficient can often be neglected. Since formula (16) expresses energy, the value must be divided by the electron charge e to obtain the confinement potential in volts. In addition, the angular frequency $\omega$ is replaced by $2\pi c/\lambda$, in order to obtain the term $2mc^2/e$, which is substantially equal to $10^6$ V. The confinement potential has the following absolute value;

$$\frac{e}{2mc^2} \cdot \frac{1}{\eta^2 + \left[1 - \frac{\Omega^2}{\omega^2}\right]^2} \cdot \left[\frac{\lambda E}{2\pi}\right]^2 \quad (17)$$

In order to study the action of the electric field in detail, i.e. the gradient of the aforementioned potential, we use the vector analysis formula:

$$\tfrac{1}{2}\vec{\text{grad}}(E^2) = \vec{E} \cdot \vec{\text{grad}}(\vec{E}) - (\text{curl } \vec{E}) \times \vec{E} \quad (18)$$

This shows that the expression for the confinement force is made up of two vectors corresponding to the two terms in the second member of equation (18) and hereinafter called the electric and magnetic confinement vectors.

The electric confinement vector, which corresponds to the first term of the second member, is the scaler product of the gradient of $\vec{E}$ by the vector $\vec{E}$ proper, which can be rewritten as follows:

$$\left[E_x \frac{\delta}{\delta x} + E_y \frac{\delta}{\delta y} + E_z \frac{\delta}{\delta z}\right] \vec{E} \quad (19)$$

This vector corresponds to the non-zero mean field resulting from variations in the electric field vector experienced by the particle which oscillates parallel to the mean direction of vector $\vec{E}$. In order to study the properties of the field of vectors around a fixed point M, we shall choose coordinate axes Ox, Oy, Oz such that the Ox direction coincides with the direction of $\vec{E}$ at M and the xOy plane coincides with the direction of the plane given by vectors $\vec{E}$ and $d\vec{E}/dx$. We than have:

$$E_y = E_z = \frac{\delta E_z}{\delta x} = O$$

and the components of the electric confinement vector are proportional to $$E_x \frac{\delta E_x}{\delta x} \text{ selon } Ox$$

$$E_x \frac{\delta E_y}{\delta x} \text{ selon } Oy.$$

These expressions are further simplified in the case where the field has planes of cimmetry or antisymmetry.

A plane of symmetry must necessarily be parallel to the vector proper. Symmetry with respect to the xOz plane results in the fact that Ey remains zero along the Ox axis, i.e. the derivative $\delta E_y/\delta x$ is zero. The electric confinement vector then has the same direction as the electric vector proper and is proportional to:

$$\frac{1}{2} \frac{\delta(E_x^2)}{\delta x}$$

A plane of antisymmetry must necessarly be perpendicular to the vector itself. Antisymmetry with respect to the yOz plane results in the fact that in the yOz plane we must have $$\frac{\delta E_x}{\delta x} = O$$

and Ex is substantially constant for small variations in x around the origin. In addition $E_y$ remains very small and the quotient $E_y/E_x$, as a first approximation, expresses the angle between the $\vec{E}$ vector and the Ox axis. The derivative of this angle with respect to the shift along the vector gives the curvature 1/R of the line of force, and the electric confinement vector is proportional to:

$$E_x \frac{\delta E_y}{\delta x} = \frac{E_x^2}{R}$$

and extends along Oy, i.e. is normal to the vector $\vec{E}$, situated in the plane of curvature and centrifugally oriented with respect to the center of curvature. The coefficient of proportionality is $e/m\omega^2$.

The magnetic confinement vector, corresponding to the second term of the second member of equation (18), expresses $\vec{B} \wedge e\vec{v}$, the confinement force resulting from the action of the magnetic induction field $\vec{B}$ on the charge moving at velocity $\vec{v}$. The mean value of this vector does not change if $\vec{B}$ and $\vec{v}$ are derived simultaneously and if the product is divided by $\omega^2$. Next, $d\vec{B}/dt$ is replaced by its value curl $\vec{E}$ and $d\vec{v}/dt$ is replaced by its value $e\vec{E}/m$, and we obtain:

$$\vec{B} \wedge e\vec{v} = \frac{e^2}{m\omega^2} \frac{(\operatorname{curl} E) \times E}{\eta^2 + \left[1 - \frac{\Omega^2}{\omega^2}\right]^2} \quad (20)$$

This is the term associated with the radiation pressure in the strict sense in the propagation direction, but it also occurs in lateral confinement. In the $TE_2$ mode, the axial magnetic field is zero near the axis, since term (20) does not occur and confinement is purely electrical. In the $TE_0$ mode, the axial magnetic field is very important, and this mode has a confining action owing to the magnetic confinement term, although the electric term does not have a confining action, as has been previously stated.

Plasma Cylindrical Resonance

We shall now study the cylindrical resonance of a plasma excited by the radial component of the electric field.

The radial electrostatic field at the surface of an indefinite rectilinear cylinder of radius r is equal to:

$$\frac{q}{2\pi\epsilon_0 h r} \quad (21)$$

if the cylinder has an uniform electric charge, the quantity of electricity q being contained within the height h. If the cylinder is full of plasma, the number p of elementary charges per unit volume if the same for positive and negative charges when the plasma is at rest. If the plasma is excited by a wave having a radial electric field, the electrons begin to oscillate whereas the nuclei remain practically stationary, because of their mass. When the electrons, which at rest are in a cylinder of radius $r_o$, change to radius r as a result of radial expansion of the cylinder, the amount of negative electricity in the cylinder remains unchanged at:

$$q = \pi r_o^2 h p e$$

However, the amount of positive electricity has increased, since the cylinder has become larger and contains more immobile nuclei. The amount of positive electricy is now:

$$q = -\pi r^2 h p e$$

Consequently, the electrons in a state of cylindrical vibration are subjected to the return force:

$$\frac{pe^2}{2\epsilon_o} \left[ \frac{r_o^2}{r} - r \right]$$

In the case of small movements around the equilibrium position defined by $r = r_o$, the equation of motion is:

$$m \frac{d^2}{dt^2} (r - r_o) = -\frac{pe^2}{\epsilon_o} (r - r_o) \quad (22)$$

and resonance occurs at the angular frequency $\omega_c$ defined by $$\omega_c^2 = \frac{pe^2}{\epsilon_o m} \quad (23)$$

It is convenient to use the wavelength expression $\lambda_c = 2\pi c/\omega_c$ by inserting the radius of an electron $\beta$ into the equation:

$$\beta = \frac{e^2}{4\pi\epsilon_o mc^2} = 2.817 \times 10^{-15} \, m.$$

We obtain:

$$p\beta\lambda_c^2 = \pi \quad (24)$$

The frequency of cyclic resonance $f_c = \omega_c/2\pi$ corresponds to the cut-off frequency of a plasma having a zero optical index, i.e., an infinite wavelength. The wave therefore penetrates very deeply into the plasma, causing cylindrical resonance.

In the case of waves having a negative phase-shift, for which the field patterns are shown in FIG. 2, the radial electric field is no longer isotropic around the axis. The deformation in the electron cloud is an elliptical deformation as shown in FIG. 3, moving rather like the tides around the earth. A simple calculation shows that the resonance frequency is always given by (23).

However, resonances cannot occur in practice unless the resonant domain is not short-circuited by an electron conduction current. In the case of cylindrical vibration, resonance can be observed since the wavelength is theoretically infinite and the length of the cylinder prevents the circuit from closing. In the case of negative phase shifts, resonance also occurs since the d.c. component of the electric field confines the plasma in the region where the lines of force are hyperbolic. If the plasma extended to a region where the lines of electric force closed, resonance would be greatly attenuated.

The cylindrical resonance frequency of the plasma can be modified by subjecting it to an axial magnetic field. In that case the dynamic equations are more complicated than equation (22) since the action of the magnetic field H on the electron speed must be added to the electrostatic return force. In such cases, the radial vibration is coupled to the azimuthal vibration and two equations of motion are needed. Putting $\omega_H = e H/m$, we obtain:

$$\left. \begin{array}{l} \dfrac{d^2 r}{dt^2} = -\omega_c^2 (r - r_o) - \omega_H r \dfrac{d\phi}{dt} - \dfrac{e E_o}{m} \cos(\omega t - \psi) \\[6pt] \dfrac{d}{dt}\left[ r \dfrac{d\phi}{dt} \right] = \omega_H \dfrac{dr}{dt} - \dfrac{e E_o}{m} \sin(\omega t - \psi) \end{array} \right\} \quad (25)$$

If we integrate the second equation (25) and transfer the resulting value for $r d\phi/dt$ into the first equation (25), we obtain:

$$\frac{d^2r}{dt^2} = -(\omega_c^2 + \omega_H^2)(r - r_o) - \left[1 + \frac{\omega_H}{\omega}\right]\frac{eE_o}{m}\cos(\omega t - \psi) + \omega_H C_1 \quad (26)$$

$$r\frac{d\phi}{dt} = \omega_H(r - r_o) + \frac{eE_o}{m\omega}\cos(\omega t - \psi) + C_1$$

This system of equations is solved by successive approximations. As a first approximation, we assume that $\psi$ is constant irrespective of r and $\phi$, i.e. the wave has circular polarization without an aziputhal phase shift. We then obtain equations (27) hereinafter, wherein $\Omega$ is zero. $\psi$ is then replaced by the first approximation of $\phi$ thus found, and the resulting confinement field is shown by the fact that, after this transformation, the means value of $\cos(\omega t - \phi)$ is no longer zero. In order to allow for the new amplitude of $\phi$ given by (27) we must multiply it by the factor in brackets occurring in the new expression.

The confinement force drives the electrons towards the axis, thus producing an electrostatic force which drives the positive ions. This results in a slow, continuous decrease in the electron coordinate r, which can be treated as a long-term variation. It results from the second equation (26) that when r decreases, the electrons begin to rotate around the axis at an angular speed $-\Omega$. Hence the terms in $\Omega$ coming from the constants of the first integration and appearing in the second approximation ($\Omega$ increases slowly from 0 to $\omega_H$).

If the axial magnetic field is the most intense on the side of the material, the plasma rings will concentrate there, i.e. where the electrons and positive ions rotate in opposite directions. These are the conditions for obtaining the maximum number of impacts between nuclei. As the particles have helical trajectories, the path they travel through a cube large enough to contain a number of helical turns is much longer than the path they would travel in a straight line. If $\gamma$ is the helix radius and $\delta$ is its pitch, the ratio of the paths travelled is:

$$\sqrt{1 + \left[\frac{2\pi\gamma}{\delta}\right]^2}$$

and the probability of an impact between two nuclei is multiplied by the same ratio.

If, on the other hand, the axial magnetic field increases away from the material, the rings of current concentrate at a short distance from the material, which is a help in obtaining the emission of coherent X-rays.

$$r = \frac{r_o}{1 + \frac{\Omega}{\omega_H}} + \frac{\omega + \Omega + \omega_H}{(\omega + \Omega)^2 - \omega_c^2 - \omega_H^2} \cdot \frac{eE_o}{m(\omega + \Omega)} \cos[(\omega + \Omega)t - \phi_o] \quad (27)$$

$$\phi = \phi_o - \Omega t + \left[1 + \frac{\omega_H(\omega + \Omega + \omega_H)}{(\omega + \Omega)^2 - \omega_c^2 - \omega_H^2}\right] \cdot \frac{eE_o}{m(\omega + \Omega)^2} \sin[(\omega + \Omega)t - \phi_o]$$

In addition, expansion of the electron cloud at a distance from the axis, or compression thereof on to the axis of propagation, results in an induced magnetic field which opposes the inducing magnetic field in the first case and reinforces is in the second case. If we consider all the electrons near the circumference of a circle of radius r centered on the axis of propagation, they behave like a conducting ring. If the radius of the ring is varied, a current will be induced and partly oppose the variation of magnetic flux in the ring. If the radius increases the magnetic field decreases, whereas the magnetic field increases if the radius decreases.

Consequently, when a negatively phase-shifted wave compresses the electrons on to the propagation axis, the positive ions follow them provided the plasma remains neutral and, as equation (27) shows, the ions begin to rotate in the opposive direction from the electrons, thus reinforcing the current rotating around the propagation axis and considerably increasing the magnetic field along the axis. In addition, all the current rings move so as to surround the maximum flux of the magnetic field produced by neighbouring rings. Consequently the filaments of currents are squeezed agains one another, resulting in very strong compression of the plasma, similar to a pinch effect.

The aforementioned contiguous rings of current can be compressed against the material or moved away from it provided the axial inducing magnetic field is given a sufficiently steep gradient.

The reason is that the ions in the rings all rotate in the same direction and there are few impacts between them. On the other hand, they undergo a very large number of impacts with the free electrons rotating in the opposite direction, so that they are very thoroughly stripped of their last associated electrons. The axial speed of the ions is low and they tend to approach one another axially, since the rings interact. This is advantageous, since the atoms have much more change of stimulating radiation towards one another if they approach than if they move away.

These are the various effects which can be obtained with polarized waves with azimuthal phase-shift, the phase-shift being either positive or negative.

BRIEF DESCRIPTION OF THE DRAWINGS

The invention will now be described in detail with reference to the accompanying drawings in which:

FIGS. 4, 5, 6 and 7 relate to a first model of a wave mode converter using an isotropic material in the form of a helicoid or a spiral stairway, the pitch of the helicoid and the height of the steps being such as to obtain the fields in FIGS. 1 and 2;

FIRST EMBODIMENT (FIGS. 4, 5, 6 AND 7)

Figure 1:
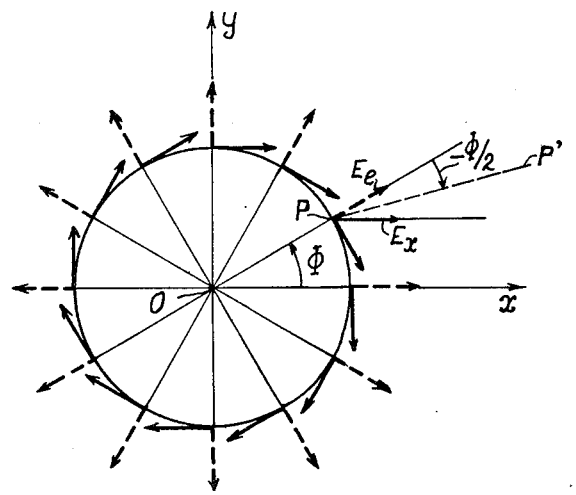
FIG. 1, already described in the theoretical part, represents a circular-polarized electric field, having a positive azimuthal phase shift.

FIG. 4 shows a first model of a wave mode converter. It shows a wave mode converter comprising a quarter-wave plate 11 converting a rectilinear-polarized wave into a circular-polarized wave and an optical device 12 for phase-shifting the components of the circular-polarized wave proportionally to the azimuth $\phi$. The optical device 12 comprises a plate of isotropic material such as molten silica having a plane surface 121 and a helical cut surface 122. The excess thickness $\Delta z$ of the plate at a point having the azimuth $\phi$ is given by the expression:

$$\Delta z = \frac{\phi}{2\pi} \frac{\lambda}{n-1} \quad n, \text{ index of refraction.}$$

The excess thickness increases from 0 to $\lambda/n-1$.

For convenience, the helical phase-shifter in FIG. 4 can be replaced by a plate 13 having a stepped surface as shown in FIG. 5. There are, e.g. six steps $13_1$–$13_6$, each having an angular extension of $\pi/3$. The height of each step is:

$$h = \lambda/6(n-1)$$

More generally, if there are q steps instead of six, the height h of each step is equal to:

$$h = \lambda/q(n-1)$$

The steps in component 13 can be constructed either by removing material by etching or the like, or by adding material, with the help of high vacuum evaporation techniques.

In the case of large-diameter beams, it is possible and advantageous to use a single plate as the quarter-wave plate and for phase-shifting proportional to the azimuth. In that case, the quarter-wave plate is made of quartz and has the following thickness:

$$(2k+1)\frac{\lambda}{4(n_o - n_e)} = (2k+1) \times 30{,}32 \ \mu m \text{ for } \lambda = 1{,}06 \ \mu m$$

where $n_o$ and $n_e$ are the ordinary and extraordinary indices of quartz.

Six equilateral triangular quarter-wave plates $14_1$–$14_6$ are cut from quartz crystals. The six plates are cut so that when they are joined to form a regular hexagon, the directions of the slow and fast axes of quartz are the same over the entire surface of the hexagon. In order to cut them, the six plates $14_1$–$14_6$ are placed on a glass plate 15, after the hexagon periphery has been spread out in a straight line (see FIG. 7). In that case, the slow axis in each plate is in the direction shown in FIG. 7. Next, the free surfaces of the triangles are polished along a plane at a slight inclination to the plane of the holding plate, so that the thickness at the centers of the external plates $14_1$ and $14_6$ is equal to the theoretical thickness plus or minus $\lambda/2(n-1)$ respectively, n being the mean value of the indices. This variation in thickness of 1 $\mu m$ does not interfere with the properties of quarter-wave plates and, when the six triangular plates $14_1$ to $14_6$ are placed on a glass plate 16 in the position in which they form a hexagon, the desired azimuthal phase shift is in fact obtained. Plate 6 is square, to facilitate marking the mode converter with respect to the rectilinear polarization of the incident wave. The azimuthal phase shift of the wave is always brought about in the direction of increasing thickness. The resulting wave has circular polarization and a positive or negative azimuthal phase shift, depending whether the polarization of the incident wave is parallel to one or the other perpendicular side of the square plate 16.

Figure 8:
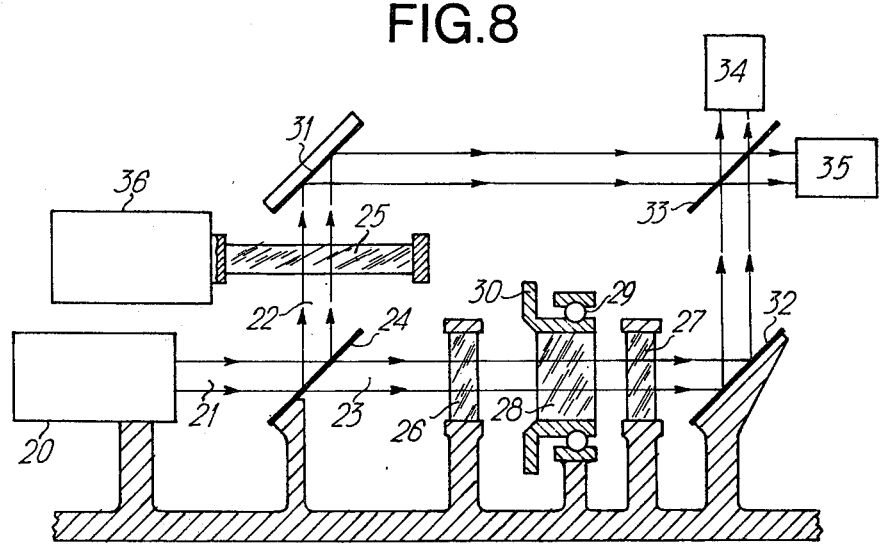
FIG. 8 shows a device for checking the suality of the wave mode converter in FIGS. 4 and 5.

Checking the Manufacture of the Mode Converter (FIG. 8)

Very accurate checking means are required when cutting the plates of the mode converter in FIG. 6. Such checking means will be described with reference to FIG. 8. A laser 20 generates a rectilinear polarized monochromatic beam 21. The beam is divided into two beams 22, 23 by a beam splitter formed by semi-reflecting mirror 24. Beam 22 crosses the mode converter 25 under test, whereas beam 23 travels through a standard phase-shifter comprising two quarter-wave plates 26 and 27, between which a half-wave plate 28 is mounted in ball bearings 29 and can rotate around its axis. A graduate dial 30 is used for accurately determining the angle $\phi$ through which the half-wave plate turns. As is known, the phase-shift undergone by the beam travelling through plates 26, 27, 28 is equal to $2\phi$. The two beams 22, 23 are reflected by mirrors 31, 32 respectively and then recombined by the semi-reflecting mirror 33. The photo-electric cells 34, 35 are used to detect interference, either by indicating zero in one cell or by showing when the detected intensities are equal. The transparent plate 25 under test is secured by a holder 36 for accurately moving it in a plane perpendicular to the beam and rotating it around the beam axis. In order to check variations in the thickness of 25 during motion, the orientation of the half-wave strip is adjusted before moving it, so that the state of cells 34 and 35 is clearly marked. Item 25 is moved and a note is taken of the extent to which the half-wave plate has to be turned to restore the initial state of the cells.

Figure 9:
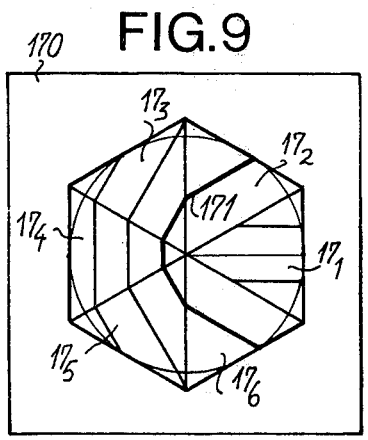
FIGS. 9, 10 and 11 relate to a second model of wave converter using a birefringent material cut into triangular or sectoral elements assembled so that their slow and fast axes are in directions such as to obtain the fields in FIGS. 1 and 2.
Figure 10:
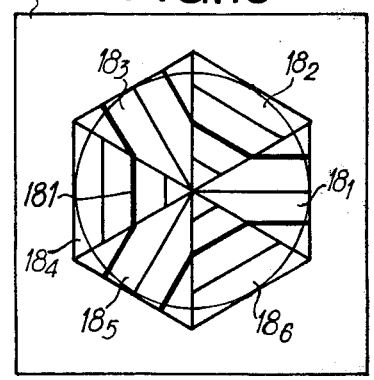
Figure 11:
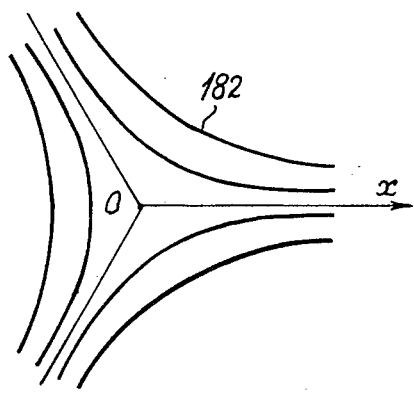

Second embodiment (FIGS. 9, 10 and 11)

In the embodiment in FIGS. 9 and 10, an azimuthal phase shift is obtained not by selectively varying the optical thickness of the system but by a set of sector-shaped half-wave plates all having the same thickness and fast axes oriented as defined hereinafter.

In general, if it is desired to convert a rectilinear-polarized incident wave into an emergent wave having a given electric field pattern, the fast axis at a point must extend along the bisector between the direction of the electric field of the incident wave and the direction of the electric field of the emergent wave.

If, at a point P in FIG. 1, it is desired to convert an incident electrid field $E_x$ parallel to Ox into an emergent field $E_e$ at an angle $\phi$ to Ox, the fast axis PP' of the sector-shaped half-wave plate covering point P must extend along the bisector of $E_xE_e$, i.e. must be at an angle $\phi/2$ to the radius vector OP. If the sector-shaped plates are very narrow, the equation of curves which are tangent at all points to the direction of the fast axis PP' is:

$$r = \frac{k}{[\sin \phi/2]^2} \quad (28)$$

This equation can be obtained by replacing the values of $N_1$, $N_2$ by 0, 1 respectively in formulae (10) and (11). The equation represents a family of parabolas.

The corresponding mode converter is shown in FIG. 9. It comprises six half-wave sector-shaped plates $17_1$-$17_6$ in the form of equilateral triangles; in each plate, the fast axis is indicated by shading. As can be seen, the shading forms substantially parabolic broken lines 171. The plates are joined together on a glass plate 170.

Figure 2:
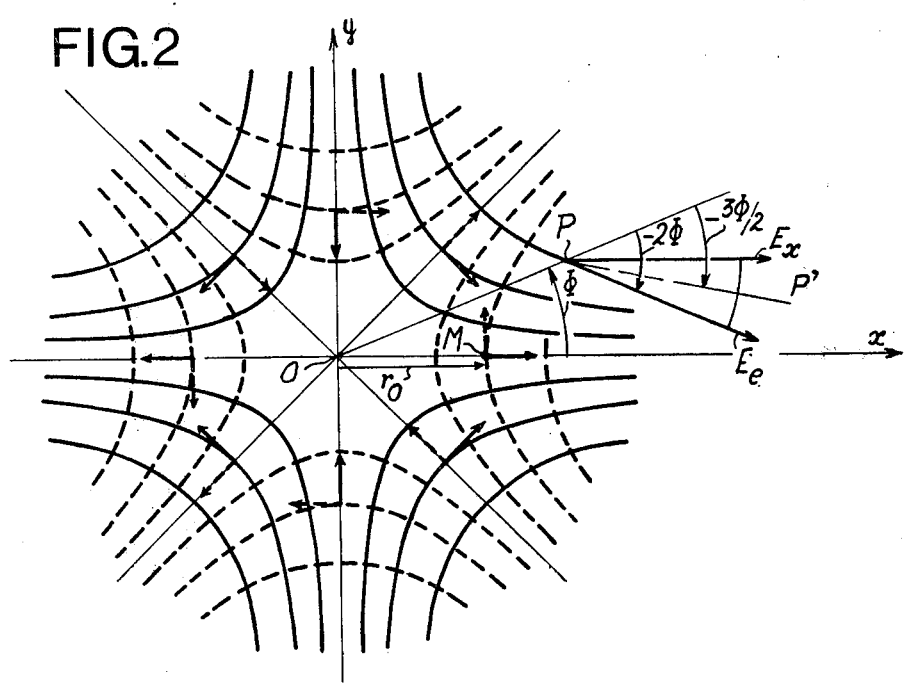
FIG. 2, already commented on in the theoretical part, represents a circular-polarized electric field having a negative azimuthal phase shift.
Figure 3:
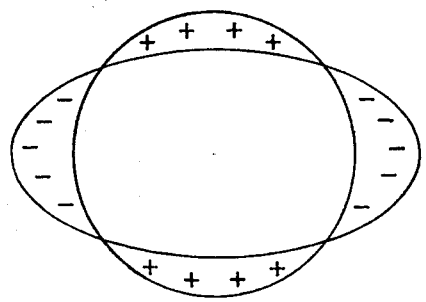
FIG. 3 is a diagram showing the cylindrical contraction in the plasma caused by the field in FIG. 2.

If, at a point P on FIG. 2, it is desired to convert an incident rectilinearly polarized electric field $E_x$ parallel to Ox into an emergent field $E_e$ at an angle $-\phi$ to Ox, the fast axis PP' must be at an angle of $-3/2\phi$ to the radius vector OP. If the sector-shaped plates are very narrow, the equation of curves which are tangent at all points to the direction of the fast axis PP' is:

$$r = \frac{k}{\left[\sin(\frac{3}{2}\phi)\right]^{2/3}} \quad (29)$$

if the values of $N_1$, $N_2$ are replaced by 0 and $-1$ respectively in expressions (10) and (11).

Equation (29) represents a family of hyperbolic curves 182 having asymptotes at 120° and shown in FIG. 11.

The corresponding mode converter is shown in FIG. 10. It comprises six sector-shaped half-wave plates $18_1$-$18_6$ in the form of an equilateral triangle; in each plate, the fast axis is in the direction indicated by shading. As can be seen, the shading forms broken lines 181 having substantially the shape of the hyperbolic curves in FIG. 11. The plates are placed together on a glass plate 180. Three of the plates $18_1$, $18_3$, $18_5$ have their fast axis perpendicular to the outer bases of the equilateral triangles, whereas the other three $18_2$, $18_4$, $18_6$, which are in between the first three, have their fast axis parallel to the outer bases of the triangles, which are also the outer sides of the hexagon. A device of this kind converts incident waves rectilinearly polarized along Ox into waves having lines of force which are equilateral hyperbolas, as shown by chain lines in FIG. 2, whereas the device converts incident waves rectilinearly polarized along Oy into waves having lines of force which are equilateral hyperbolas as shown in continuous lines in FIG. 2.

The mode converters in FIGS. 9 and 10 are preceded by a quarter-wave plate which converts the rectilinearly polarized incident wave into a circularly polarized wave. The latter is the incident wave in the mode converter.

In the general case of waves having an $N^{th}$ order negative azimuthal phase shift, the equation of the electric lines of force is:

$$r = \frac{k}{[\sin(1 + N)\phi]^{1/(1 + N)}}$$

and the curves tangent to the fast axes of the half-wave plates have the following equation:

$$r = \frac{k}{\left[\sin(1 + \frac{N}{2})\phi\right]^{2/(2 + N)}}$$

In all the preceding description, it has been assumed that the source of energy was a laser, but the requirements may be less exacting since often the electromagnetic wave used as a source of energy only needs to the sufficiently coherent to have a definite polarization and to be sufficiently plane to be concentrated; under these conditions, many sources can be used including sunlight after passage through a polarizer.

Figure 12:
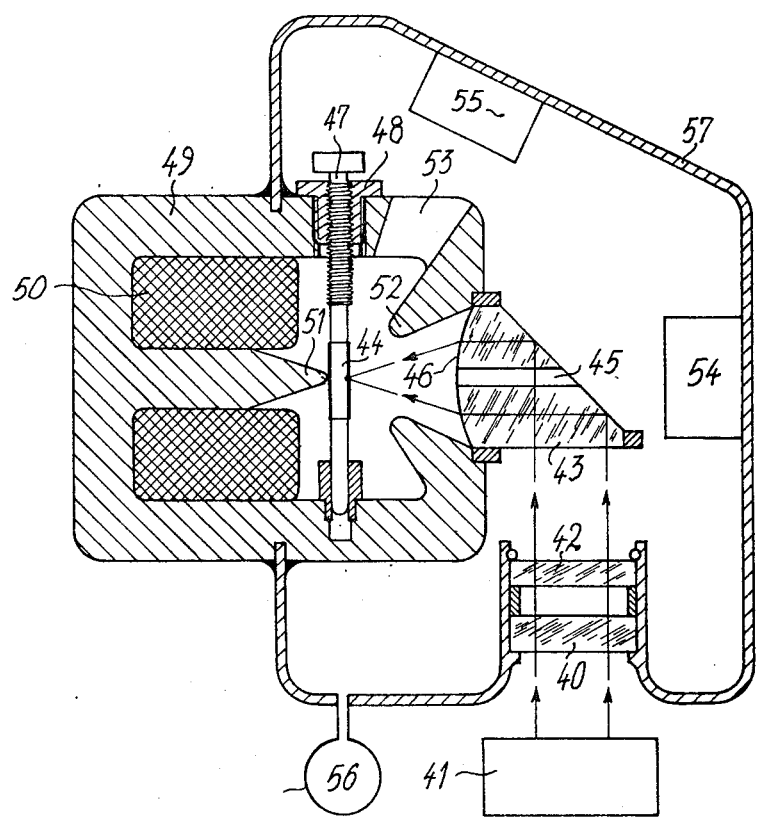
FIG. 12 shows a wave mode converter used in a plasma generator for obtaining maximum density in order to approach thermonuclear fusion reactions.

A Plasma Generator for Obtaining Maximum Density (FIG. 12)

FIG. 12 is an axial section through a device for studying dense, hot plasmas. A quarter-wave plate 40 converts a rectilinear polarized wave from laser 41 into a circular polarized wave. The wave is given an azimuthal phase shift by a phase-shifter 42, which can either be of the kind in FIGS. 4 or 5 or of the kind in FIG. 10. A prism 43 reflects the wave towards the target material 44; to this end, it has an aperture 45 through which the reacting products can escape, and its surface 46 is convex to form a lens and focus the energy on to the material. The material 44 forming the target is cylindrical and held by a screw 47 which rotates in a nut 48 so that the surface of material presented to the laser can be changed when required. Nut 48 is secured to armature 49 on an electromagnet energized by a winding 50. As can be seen, the electromagnet pole 51 is much narrower than pole 52, and consequently the magnetic field directed along the axis of the incident beam decreases with distance from the material, so that the rings of plasma formed by the impact of the beam are compressed against the material. An aperture 53 in the magnet armature is used for lateral observation of the phenomenon.

The instruments for observing or using the radiation are denoted by 54 and 55. The whole device is based in an evacuated chamber 57, the vacuum being maintained by a pump 56.

Figure 13:
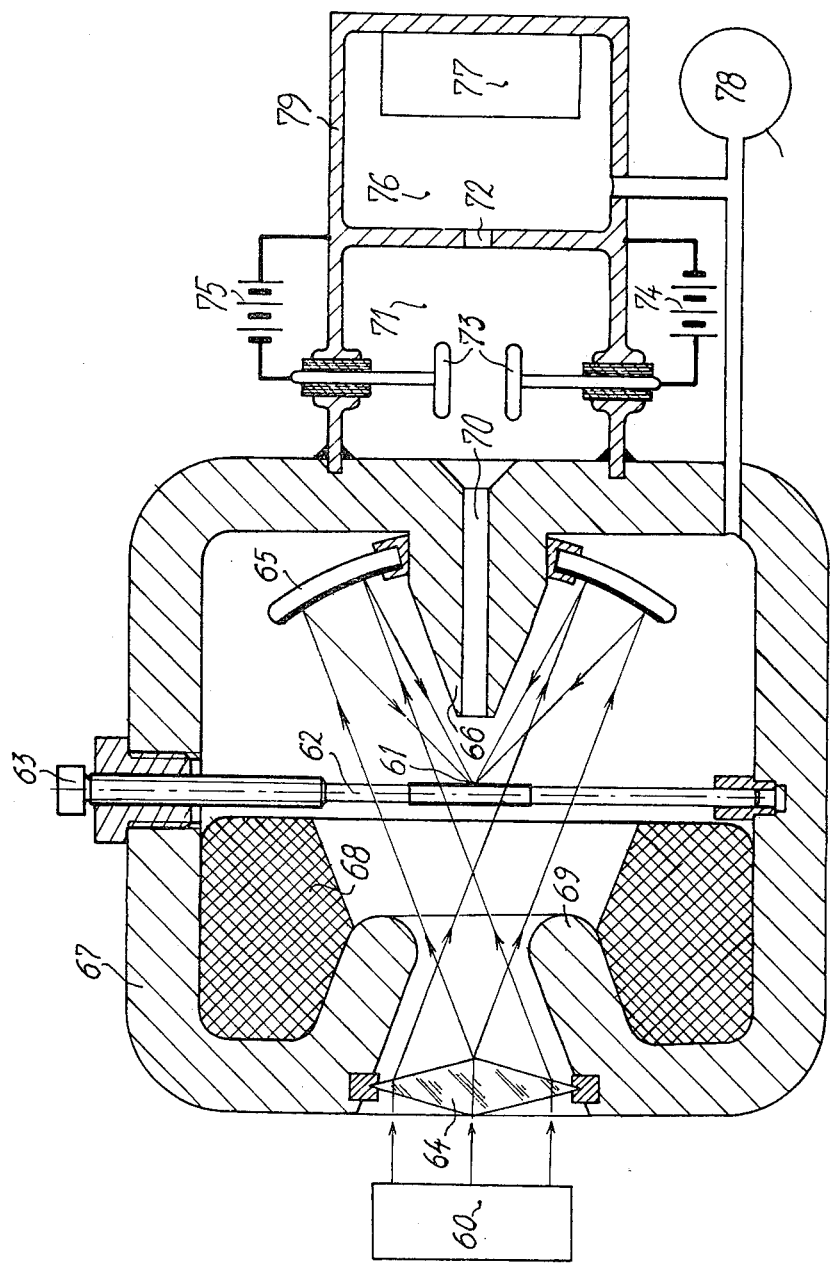
FIG. 13 shows a wave mode converter used in a plasma generator for elongating the plasma along an axis in order to produce coherent X-rays in the axial direction.

A Plasma Generator for Elongating a Plasma Along an Axis in Order to Emit Coherent X-Rays Along the Axis (FIG. 13)

FIG. 13 shows an embodiment of the invention designed more particularly for emitting X-rays. To this end, the axial magnetic field intensifies with distance from the target; so that the rings of plasma are removed therefrom as rapidly as possible. The target material is denoted by 61; it is borned by a rod 62 having a threaded part 63 which can be screwed so as to change the material at the point of impact. The laser, the quarter-wave plate and the mode transformer bear the general reference 60. The cylindrical beam coming from the system is converted into a conical beam by a conical lens 64 for suitably illuminating a concentration mirror 65 disposed in a ring around pole 66 of electromagnet 67 energized by coil 68.

Pole 66 is much sharper than the opposite pole 69, si that the magnetic field increases from target 61 towards pole 66. In addition, pole 66 is formed with an aperture 70 for X-ray issuance. Chamber 71 is adapted to remove charged particles from the beam. To this end, an electric or magnetic field is produced in the chamber and deflects charged particles and drops them on the wall, whereas the X-rays are not deflected and travel through a diaphragm 72. The deflecting field is produced by capacitor plates 73 energized by sources 74 and 75. A second chamber 76 is used for measuring or using the X-rays. Device 77 is designed for such use; it is, e.g. a photographic plate recording the hologram of an object placed near diaphragm 72. All the aforementioned devices operate in a vacuum, produced by pump 78 in a chamber bounded by partition 79, electromagnet armature 67 and lens 64.

What I claim is:

1. A wave mode converter for converting an electromagnetic, light and infrared wave into an outgoing wave having a mode confining the particles of a plasma from a target material, comprising means for converting said incoming wave into a circular polarized wave beam, means for phase shifting with respect to time at any given point of the beam said circular polarized wave beam proportionally to the azimuth of said given point around the axis of propagation of the beam, means for focusing the phase shifted outgoing wave beam on to said target material and a generator of a d.c. magnetic field directed along said outgoing beam.

2. A wave mode converter according to claim 1, in which the phase shifting means phase shifts with respect to time the circular polarized wave beam at any given point thereof proportionally to the azimuth of said given point around the axis of propagation of the beam, the phase shift azimuthally increaning in the direction of rotation of the circular polarization.

3. A wave mode converter according to claim 1, in wich the phase shifting means phase shifts with respect to time the circular polarized wave beam at any given point thereof proportionally to the azimuth of said given point around the axis of propagation of the beam, the phase shift azimuthally decreasing in the direction of rotation of the circular polarization.

4. A wave mode converter according to claim 1, wherein the means for phase shifting the circular polarized wave proportionally to its azimuth around its axis of propagation comprises a plate of isotropic material transparent to said incoming wave and having a plane surface and a helicoidal surface, the pitch of the helicoid being equal to $\lambda/(n-1)$ where $\lambda$ is the wavelength of the incoming wave and n is the index of the transparent material.

5. A wave mode converter according to claim 1, wherein the means for phase shifting the circular polarized wave proportionally to its azimuth around its axis of propagation comprises a plate of isotropic material transparent to said incoming wave, having a plane face and a face in the form of a spiral staircase, the spiral steps having a sector shape with an apex of $2\pi/q$ and a height of $\lambda/q(n-1)$ where $\lambda$ is the wavelength of the incoming wave, n is the index of the transparent material and q is the number of steps.

6. A wave mode converter according to claim 1, wherein the means for phase shifting the circular polarized wave proportionally to its azimuth around its axis of propagation comprises a number of elementary half-wave plates made of birefringent material transparent to said incoming wave and positioned so that the slow and the fast axes of the elementary plates are disposed along the bisectors of the angle between the direction of the circular polarized wave electric vector at a given instant and the direction at the same instant of the electric vector of the wave phase shifted proportionally to its azimuth around its axis of propagation.

7. A wave mode converter according to claim 6, wherein the elementary half-wave plates of birefringent material transparent to said incoming wave are triangular and joined to form a regular polygon, the slow and fast axes of the elementary plates being disposed in each plate so as to form a broken parabolic curve on the regular polygon.

8. A wave mode converter according to claim 6, wherein the elementary half-wave plates of birefringent material transparent to said incoming wave are triangular and joined to form a regular polygon, the slow and fast axes of the elementary plates being disposed in each plate in order to form a broken curve on the regular polygon, the curve being represented in polar coordinates by the equation:

$$r = \frac{k}{\left[\sin(1 + \frac{N}{2})\phi\right]^{2/(N+2)}}$$

where k and N are integers.

9. A wave mode converter according to claim 7, wherein the elementary half-wave plates of birefringent material transparent to said incoming wave are six in number, have the shape of equilateral triangles and are formed into a regular hexagon, the fast axis of the plates forming angles of 0°, 30°, 60°, 90°, 120°, 150° with a reference direction in the six successively adjacent elementary plates.

10. A wave mode converter according to claim 8, wherein the elementary half-wave plates of birefringent material transparent to said incoming waves are six in number, have the shape of equilateral triangles and are formed into a regular hexagon, the fast axis of the plates forming angles of 0°, 150°, 120°, 90°, 60°, 30° with a reference direction in the six successively adjacent elementary plates.

11. A wave mode converter according to claim 1, wherein the d.c. magnetic field generated by said d.c. magnetic field generator has a gradient having a maximum field on the side of the target material in order to obtain a maximal plasma density.

12. A wave mode converter according to claim 1, wherein the magnetic field generated by said d.c. magnetic field generator has a gradient with a minimum field on the side of the target material, in order to obtain an elongated plasma.

13. A wave mode converter according to claim 1, wherein the means for converting said incoming wave into a circular polarized wave beam and the means for phase shifting the circular polarized wave proportionally to its azimuth around its axis of propagation comprise a number of elementary quarter-wave plates of birefringent material transparent to said incoming wave and having a sector shape with an apex angle of $2\pi/q$, positioned so that the directions of the fast axes are the same over the entire area of said plates, the thickness of the plates varying slightly about the thickness corresponding of the quarter wave plate and the variation in thickness between two successive elementary plates being $\lambda/q(n-1)$, wherein $\lambda$ is the wavelength, n the mean index of the birefringent material and q the number of plates.

* * * * *